United States Patent [19]

Krisch et al.

[11] 4,255,683

[45] Mar. 10, 1981

[54] SALIENT POLE FOR AN ELECTRIC MACHINE

[75] Inventors: Ernst Krisch, Konstrukteru; Jorg Meister, Weiermattring; Josef Moser, Wicklereitechniker, all of Switzerland

[73] Assignee: BBC Brown Boveri & Company Limited, Baden, Switzerland

[21] Appl. No.: 882,905

[22] Filed: Mar. 2, 1978

[30] Foreign Application Priority Data

Mar. 9, 1977 [CH] Switzerland ............... 2923/77

[51] Int. Cl.$^3$ ............................................. H02K 3/48
[52] U.S. Cl. ...................................... 310/214; 310/45; 310/194; 310/260; 310/269; 336/198
[58] Field of Search ................. 310/269, 45, 215, 214, 310/208, 218, 258, 201, 179, 260, 270, 46, 177, 194; 336/198

[56] References Cited

U.S. PATENT DOCUMENTS

| 896,321 | 8/1908 | Reist | 310/269 |
| 3,106,654 | 10/1963 | Wesolowski | 310/269 |
| 3,339,097 | 8/1967 | Dunn | 310/269 |
| 3,590,301 | 6/1971 | Woydt | 310/208 |
| 3,600,801 | 8/1971 | Larsen | 310/208 |
| 3,624,441 | 11/1971 | Todd | 310/258 |
| 3,728,566 | 4/1973 | Costello | 310/269 |

FOREIGN PATENT DOCUMENTS

| 1070284 | 12/1959 | Fed. Rep. of Germany | 310/269 |
| 561973 | 5/1975 | Switzerland | 310/258 |

*Primary Examiner*—R. Skudy
*Attorney, Agent, or Firm*—Burns, Doane, Swecker & Mathis

[57] ABSTRACT

A salient pole includes a flat coil made up of a multilayer winding of round wire. The wire includes an adhesive layer which is cured after winding to consolidate the winding. The winding is within a U-shaped channel which is impregnated with resin to fill any gaps. The flat coil fits over a pole core and is fixed thereto by means of spacers which axially space the coil from the pole core and radially space the coil from the machine casing.

3 Claims, 3 Drawing Figures

SALIENT POLE FOR AN ELECTRIC MACHINE

BACKGROUND OF THE INVENTION

The present invention relates to a salient pole having at least one flat coil for use in an electric motor, generator or the like, particularly a D.C. motor or generator, and to a process for the manufacture thereof.

Swiss Pat. No. 561,973 discloses an electric machine such as a motor or generator with salient poles. An exciter winding of the machine is made up of a number of disc-shaped flat conductors which are wound with flat wire and insulated from one another. The winding is impregnated with a curable composition which is subsequently cured. The individual coils of the excited winding have a single-layer winding of wire. The coils are held at a distance from one another and from the yoke and pole shoe of the machine. During manufacture, the coils can be placed over the pole core without the need for a holding device. An additional insulation layer is located between the coils and the pole core.

Coils of this type have a small height but, due to the small number of windings, are only useful in low voltage environments such as those associated with pilot exciter windings, for example. For the main poles of relatively small machines, where higher voltages are required and in which the number of windings is substantially greater due to the shorter length of winding, it is necessary to wind several layers of wire. As a result, the height of the winding is increased so that, consequently, larger poles must be employed. This in turn entails a larger machine casing and an increase in the axle height of the machine. Therefore, the previously described salient pole arrangement of the Swiss Patent can not be utilized for the windings of poles in which higher voltages are required, such as main poles, for example.

Round wires has not been suitable in the past for use in flat coils since adequate bonding could not be achieved. Moreover, cavities remain between the winding and the insulation which enable the insulation to detach itself or form bulges. A further problem is the wedge action which produces a pressure on the round wire windings. A force of about 100 kg/cm$^2$ per layer can be generated.

OBJECTS AND BRIEF SUMMARY OF THE INVENTION

It is an object of the present invention to provide a salient pole having a flat coil with a comparatively large number of windings of round wire.

It is another object of the present invention to provide a salient pole in which the coil is fixed to the core in a simple manner and a good fit of the materials is ensured.

It is a further object of the present invention to provide a process for the manufacture of a salient pole possessing these advantageous features.

These and other objects are achieved in accordance with the present invention by providing a flat coil consisting of a round wire having an adhesive layer. Spacers are provided on the end faces of the pole core for axially spacing and fixing the flat coil and, at the same time, for radially spacing the coil from the machine casing.

Preferably, the adhesive layer of the round wire consists of a pre-polymerised synthetic resin which is fully polymerised after winding. This gives good bonding and extensive consolidation of the flat coil. It is advantageous to provide the flat coil with an insulation layer consisting of a polyamide paper channel, a glass fiber tape wound over the channel and an impregnating agent. An insulation of this type firmly adheres to the winding and allows good heat transfer. The means for fixing and spacing the coil are L-shaped spacers which are fixed to the end faces of the pole core and are in contact with the inner wall of the machine casing. This makes air-cooling over a large area possible. Bolts or bars engaging the pole core in the axial direction are particularly suitable for fixing the spacers. This results in a simple and secure fixing of the spacers.

A salient pole constructed in accordance with the present invention is manufactured by a process in which the winding of the flat coil is wound from a round wire provided with an adhesive layer and subsequently consolidated. The flat coil is then pushed over the pole core and fixed with the aid of spacers which are arranged between the machine casing and the coil and also between the coil and the end face of the pole core.

Preferably, the winding is placed, after consolidation, into a channel of polyamide paper. The paper channel is wound with a glass fiber tape and impregnated with a synthetic resin. This not only results in a good insulation but all the cavities within the channel are filled with resin. The latter fact prevents bulging of the insulation and ensures good mechanical protection of the coil, coupled with good heat transfer.

Further details of the invention can be seen from an illustrative embodiment explained in more detail in the following text and by reference to the drawings.

DESCRIPTION OF THE DRAWINGS

Figure 1:
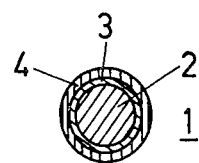
FIG 1 illustrates a cross-sectional view of a round wire.

FIG. 1 illustrates a cross-sectional view of a round wire 1. The round wire 1 consists of a copper conductor 2, a lacquer insulation layer 3 surrounding the conductor 2 and an exterior layer 4 which surrounds the lacquer insulation layer 3. The exterior layer 4 consists of a synthetic resin which is pre-polymerised and subsequently heat-cured.

Figure 2:
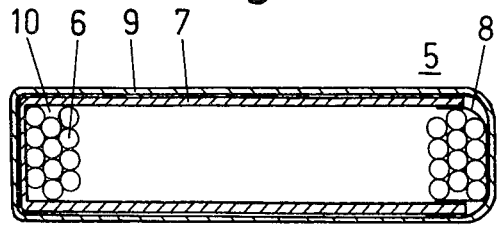
FIG. 2 illustrates the cross-sectional view of a flat pole coil of round wire such as that illustrated in FIG. 1.

FIG. 2 illustrates a flat coil 5 having a round wire winding 6 and an insulation layer covering the winding 6. Each winding layer is offset relative to the next layer by one-half a wire thickness. The winding 6 is located in a U-shaped channel 7 which consists of polyamide paper. The U-shaped channel 7 covers the inside of the coil and the sides adjacent thereto. A sheet 8 of polyamide paper is applied to the outside of the winding 6 at the open end of the U-shaped channel 7. A glass fiber tape 9 is wound around the polyamide paper insulation layer 7, 8. The coil 5 is completely impregnated with a curable synthetic resin 10 so that the free spaces between the winding 6 and the insulation layer 7, 8 are filled with the synthetic resin 10.

Figure 3:
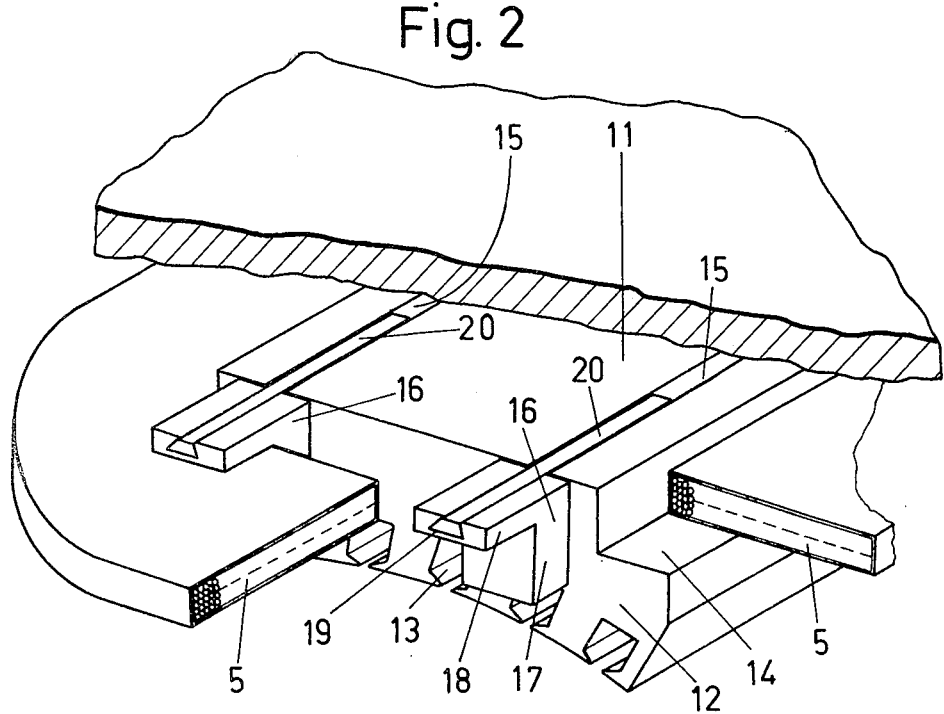
FIG. 3 is a perspective view of a main pole of a D.C. machine having a coil such as that illustrated in FIG. 2.

FIG. 3 illustrates a pole core 11 having a pole shoe 12 in which grooves 13 are provided to receive a compensation winding. The longitudinal sides of the pole shoe 12 serve as a support surface 14 for the coil 5. The pole core 11 is provided with two wedge-shaped grooves 15 on the side facing the machine casing 21. Two angled spacers 16 (e.g., L-shaped) are each arranged on the end face of the pole core 11 so that a vertical arm 17 is located between the coil 5 and the pole core 11 and a horizontal arm 18 is located between the coil 5 and the machine casing. The horizontal arms 18 of the spacers 16 are provided with wedge-shaped grooves 19. The spacers 16 are fixed by means of wedge-shaped bars 20, for example slot wedges, which are inserted into the grooves 15 of the pole core 11 and the grooves 19 of the spacers 16.

In manufacturing a salient pole of the type described and illustrated in FIGS. 1–3, a coil with narrow winding layers and a large number of layers is wound from a round wire 1. The round wire 1 consists of a copper conductor 2 with a lacquer insulation layer 3 and an exterior layer 4 of prepolymerised synthetic resin. The winding 6 is consolidated by subsequently fully polymerising the synthetic resin by heat curing, for example. The coil 5 is insulated by placing the winding 6 into a U-shaped channel 7 of polyamide paper so that the inside of the winding 6 and the two adjacent sides are covered. A polyamide paper sheet 8 is applied to the outside of the winding 6. The ends of the paper sheet 8 are inserted between the winding 6 and the channel 7. This assembly is fixed with glass tape 9. The coil 6 is impregnated with a curable synthetic resin, so that the cavities which have remained between the winding 6 and the channel 7 are filled. The finished coil 5 is placed over the pole core 11 in contact with the support surface 14. Subsequently, the vertical arms 17 of the angled spacers 16 are inserted on the end face of the pole core 11 between the coil 5 and the pole core 11. The spacers 16 are disposed so that the horizontal arms 18 are on the opposite side of the coil 5 from that in contact with the support surface 14. Finally, the grooves 19 provided in the horizontal arms 18 are aligned with the grooves 15 in the pole core 11 and the slot wedges 20 are inserted into the grooves 19, 15.

The present invention provides at least the following advantages:

(a) a comparatively large number of windings in a flat coil;
(b) extensive consolidation and complete insulation of the flat coil;
(c) a simple fixing arrangement which is readily assembled and dismantled, and
(d) spacing of the coil from the core and the machine casing for purposes of cooling the coil over a large area.

The present invention may be embodied in other specific forms without departing from the spirit or essential characteristics thereof. The presently disclosed embodiment is therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:
1. A salient pole for an electric machine having a casing, said pole comprising:
 a flat coil including a winding comprised of round wire having an adhesive layer;
 a pole core having end faces, axially disposed grooves and coil support surfaces;
 L-shaped spacers having grooves aligned with the grooves of said pole core and fixed to at least one end face of said pole core by means of bars located in said grooves, and engaged by said flat coil, each of said L-shaped spacers having a first leg parallel to said end face for axially spacing said flat coil from the end face of said pole core and a second leg substantially perpendicular to said end face for radially spacing said flat coil from the machine casing and for radially supporting said flat coil and maintaining the flat coil against the support surface of said pole core.
2. A salient pole according to claim 1, wherein said adhesive layer of the round wire consists of a prepolymerised synthetic resin.
3. A salient pole according to claim 1, wherein said flat coil is provided with an insulation including a polyamide paper channel, a glass fiber tape wound around said channel and an impregnating agent.

* * * * *

UNITED STATES PATENT AND TRADEMARK OFFICE
CERTIFICATE OF CORRECTION

PATENT NO. : 4,255,683
DATED : March 10, 1981
INVENTOR(S) : Ernst Krisch, Jorg Meister and Josef Moser It is certified that error appears in the above—identified patent and that said Letters Patent is hereby corrected as shown below:

In the data listed on the first page of the patent, the inventor's residences should appear as:

Ernst Krisch, Wettingen;

Jorg Meister, Brugg;

Josef Moser, Wettingen, all of Switzerland.

Signed and Sealed this

Thirtieth Day of June 1981

[SEAL]

Attest:

RENE D. TEGTMEYER

Attesting Officer      Acting Commissioner of Patents and Trademarks